(12) United States Patent
Nonaka et al.

(10) Patent No.: US 6,614,509 B2
(45) Date of Patent: Sep. 2, 2003

(54) DISTANCE MEASURING APPARATUS

(75) Inventors: Osamu Nonaka, Sagamihara (JP); Koichi Nakata, Kokubunji (JP)

(73) Assignee: Olympus Optical Co., Ltd. (JP)

(*) Notice: Subject to any disclaimer, the term of this patent is extended or adjusted under 35 U.S.C. 154(b) by 0 days.

(21) Appl. No.: 10/017,522

(22) Filed: Dec. 7, 2001

(65) Prior Publication Data

US 2002/0105631 A1 Aug. 8, 2002

(30) Foreign Application Priority Data

Dec. 15, 2000 (JP) ........................................ 2000-382448

(51) Int. Cl.[7] .............................. G01C 3/00; G01C 3/08; G01C 5/00
(52) U.S. Cl. ..................................... 356/3.14; 356/3.08
(58) Field of Search .................................. 356/3.08, 3.1, 356/3.14, 3.01–3.16; 396/98, 104, 106, 109, 128, 139

(56) References Cited

U.S. PATENT DOCUMENTS

| | | | | |
|---|---|---|---|---|
| 5,060,003 A | * | 10/1991 | Kotani et al. ................. | 396/60 |
| 5,315,342 A | * | 5/1994 | Cocca ........................ | 396/104 |
| 6,330,055 B1 | * | 12/2001 | Higashino .................. | 356/3.06 |

FOREIGN PATENT DOCUMENTS

JP 63-49738 3/1998

OTHER PUBLICATIONS

"Camera Distance Measuring Device," U.S. Patent Application Publication US 2001/0038750 A1 to Kindaichi. Publication date NOv. 8, 2001.*

* cited by examiner

Primary Examiner—Thomas H. Tarcza
Assistant Examiner—Brian K Andrea
(74) Attorney, Agent, or Firm—Straub & Pokotylo; John C. Pokotylo (57) ABSTRACT

This distance measuring apparatus projects a first distance measurement light ray from an IRED and projects a second distance measurement light ray having an intensity higher than that of the IRED from a flash light emission portion. A distribution of incident light from the subject is converted into an electrical signal by a sensor array. A CPU determines a distance to the subject from an output of the sensor array when the first distance measurement light ray is projected and determines a distance to the subject from an output of the sensor array when the second distance measurement light ray is projected. The CPU selects either the first distance measurement light ray or the second distance measurement light ray to be used for distance measurement based on an output level of the sensor array when the first and second distance measurement light rays are not projected.

23 Claims, 6 Drawing Sheets

DISTANCE MEASURING APPARATUS

CROSS-REFERENCE TO RELATED APPLICATIONS

This application is based upon and claims the benefit of priority from the prior Japanese Patent Application No. 2000-382448, filed Dec. 15, 2000, the entire contents of which are incorporated herein by reference.

BACKGROUND OF THE INVENTION

1. Field of the Invention

The present invention relates to a distance measuring apparatus, and more particularly to improvement in a distance measuring apparatus used for an auto focus (AF) camera and the like.

2. Description of the Related Art

There are two basic AF techniques used in cameras; and the passive type, utilizing a subject image, and the active type, utilizing a light ray incident from a camera, for measuring distance.

These techniques, however, have their corresponding drawbacks. As disclosed in, for example, Jpn. Pat. Appln. KOKAI 63-49738, therefore, various kinds of AF mode in which both modes (passive and active) are combined are proposed as a hybrid mode or a combination mode.

In the proposal in which the conventional passive AF mode and active AF mode mentioned above are combined, the following matters are not sufficiently stated. For example, there is no sufficient description on improvements in either the passive or active AF modes in weak scenes.

For example, if a subject is distanced, the contrast is low and the scene is bright, and it is difficult for passive AF to utilize an image to accurately measure a distance because of the low contrast. Further, in the active AF mode, the distance cannot be accurately measured because it is too great. That is, there is a scene which is difficult to be focused even for a hybrid AF camera.

BRIEF SUMMARY OF THE INVENTION

It is, therefore, an object of the present invention to provide a distance measuring apparatus capable of stably measuring a distance irrespective of the brightness or the distance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

A first object of the present invention is to provide a distance measuring apparatus comprising:
- a sensor for detecting an incident light ray from an object;
- a light source including a first light source and a second light source which is different from the first light source;
- a circuit for detecting a reflected light component from the object based on an output from the sensor when the light source emits a light ray;
- a circuit for selecting either the first light source or the second light source to cause light generation by comparing an output from the detection circuit and a reference value; and
- a circuit for setting the reference value in accordance with an output from the sensor when the light source does not emit a light ray.

A second object of the present invention is to provide a distance measuring apparatus comprising:
- a sensor for detecting an incident light ray from an object;
- a light source for projecting a light ray onto the object;
- a circuit for detecting a reflected light component from the object based on an output from the sensor when the light source emits a light ray;
- a distance measurement circuit for calculating a distance to the object based on a quantity of reflected light from the object which is detected by the detection circuit and caused due to the projected light ray from the light source; and
- a circuit for determining a correction algorithm used when the distance measurement circuit calculates the distance to the object based on an output from the sensor when the light source does not emit a light ray.

A third object of the present invention is to provide a distance measuring apparatus comprising:
- a light source capable of switching a quantity of light;
- a sensor for receiving a light ray from an object;
- a circuit (distance calculation circuit) which calculates a distance to the subject based on an output from the sensor, and has a passive distance measurement mode for performing calculation based on a position of an incident light ray to the sensor when the light source does not emit a light ray, and an active light quantity distance measurement mode for performing calculation based on a quantity of incident light to the sensor caused due to light generation of the light source; and
- a circuit for determining a quantity of light of the light source.

A fourth object of the present invention is to provide a distance measuring apparatus comprising:
- a first light projection source for projecting a first distance measurement light ray onto an object;
- a second light projection source for projecting a second distance measurement light ray whose intensity is higher than that of the first distance measurement light ray to the object;
- a sensor array for converting an incident light distribution from the object into an electrical signal;
- first distance determining means for determining a distance to the object from an output from the sensor array when the first distance measurement light ray is projected;
- second distance determining means for determining the distance to the object from an output from the sensor array when the second distance measurement light ray is projected; and
- selecting means for selecting either the first distance determining means or the second distance determining means based on an output level of the sensor array when the first and second distance measurement light rays are not projected.

A fifth object of the present invention is to provide a distance measuring apparatus comprising:
- a sensor array for converting a distribution of light incident from an object into an electrical signal;
- a light projection source for projecting a distance measurement light ray onto the object;
- reflection signal light extracting means for extracting a reflection signal light ray from an output from the sensor array when the light projection source projects a light ray;

judging means for judging an output level of the sensor array when the light projection source is not actuated; and distance measuring means for determining distance measurement based on an image signal output obtained by the sensor array when the extracting means is not actuated, or a judged level switched by an output from the judging means and a reflected light quantity signal according to a projected light quantity of the light projection source.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 8A and 8B illustrate operations of IRED, integration and flash, in which

DETAILED DESCRIPTION OF THE INVENTION

Embodiments according to the present invention will now be described with reference to the accompanying drawings.

A function of fixed light elimination will be first explained with reference to FIG. 2.

Figure 2:
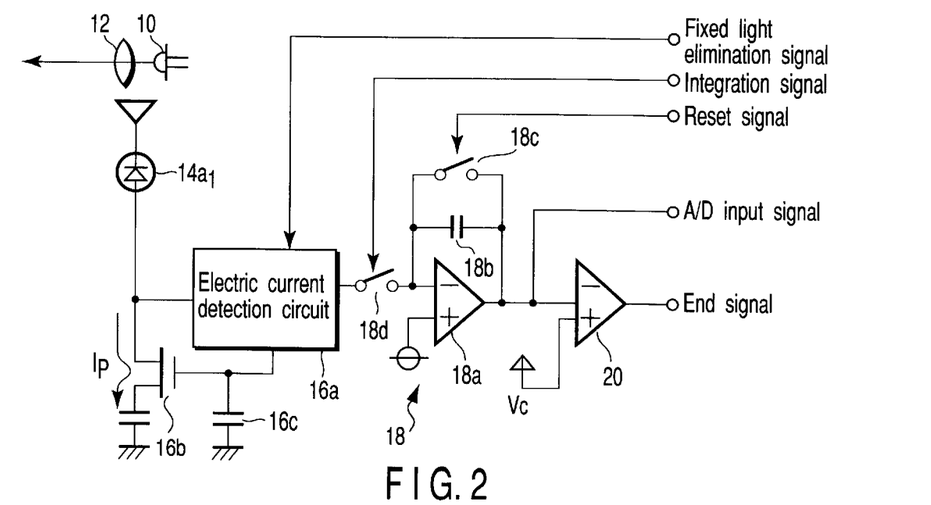
FIG. 2 is a view for illustrating a function of fixed light elimination.

In FIG. 2, a subject (not shown) is irradiated with a light ray emitted from an infrared light emitting diode (IRED) 10 which is light projecting means through a condenser lens 12. Further, a reflected light ray from the subject (not shown) enters a photo detector $14a_1$ through a photo acceptance lens (not shown). The photo detector $14a_1$ corresponds to, for example, one pixel constituting a sensor array for detecting an image signal.

In accordance with a quantity of incident light, a photoelectric current $I_P$ outputted from the photo detector is caused to flow to the ground (GND) through a fixed light elimination transistor 16b constituting a fixed light elimination circuit together with an electric current detection circuit 16a and a hold capacitor 16c. On the other hand, a gate voltage of the transistor 16b is controlled by the electric current detection circuit 16a in such a manner that an electric current does not flow the an integration circuit 18 constituted by an integration amplifier 18a, an integration capacitor 18b, a reset switch (SW) 18c and others.

The hold capacitor 16c is used for fixing the gate potential. In this state, for example, the IRED 10 is caused to emit a light ray, a distance measurement light ray is pulse-projected onto the subject through the condenser lens 12, and the electric current detection circuit 16a is switched to an inactive mode. Then, changes in voltage at the both ends of the capacitor 16c can not respond to a sudden change in the pulse light. Thus, when a switch 18d is turned on, only a light electric current corresponding to the pulse light is inputted to the integration circuit 18. Then, a photoelectric conversion voltage based on the distance measurement pulse light is supplied to an output of the integration amplifier 18a. When this output is subjected to A/D conversion, reflected light quantity data according to only a reflection signal light component can be detected.

As the fixed photo-electric current $I_P$ becomes large in a bright scene, however, error components accidentally inputted to the integration circuit are increased due to an influence of thermal noise, shut noise or the like. Furthermore, an offset error or the like of the circuit tends to have an effect.

It is, therefore, conventionally difficult to accurately detect a quantity of reflected light in a bright scene.

Figure 3:
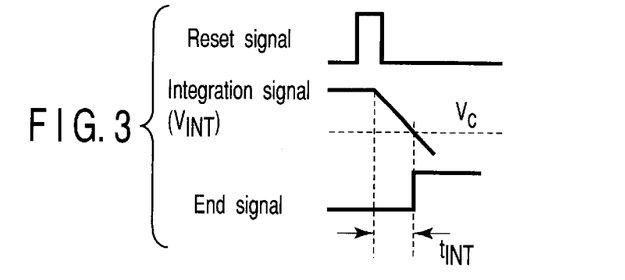
FIG. 3 is a timing chart for illustrating an operation for judging the luminosity of a fixed light ray.

In order to judge the luminosity of a fixed light ray, the electric current detection circuit 16a is switched to an inactive mode, and the operation is carried out as shown in FIG. 3. That is, after the reset switch 18c is temporarily turned on, the luminosity can be detected by passing the fixed photo-electric current $I_P$ to the integration amplifier 18a and utilizing a comparator 20 in a time $t_{INT}$ until an integral voltage reaches a predetermined level Vc. Since the time $t_{INT}$ is short in a bright scene and $t_{INT}$ is long in a dark scene, it is possible to judge the luminosity by only counting the time $t_{INT}$. At this moment, the IRED 10 is switched to the inactive mode.

Figure 1:
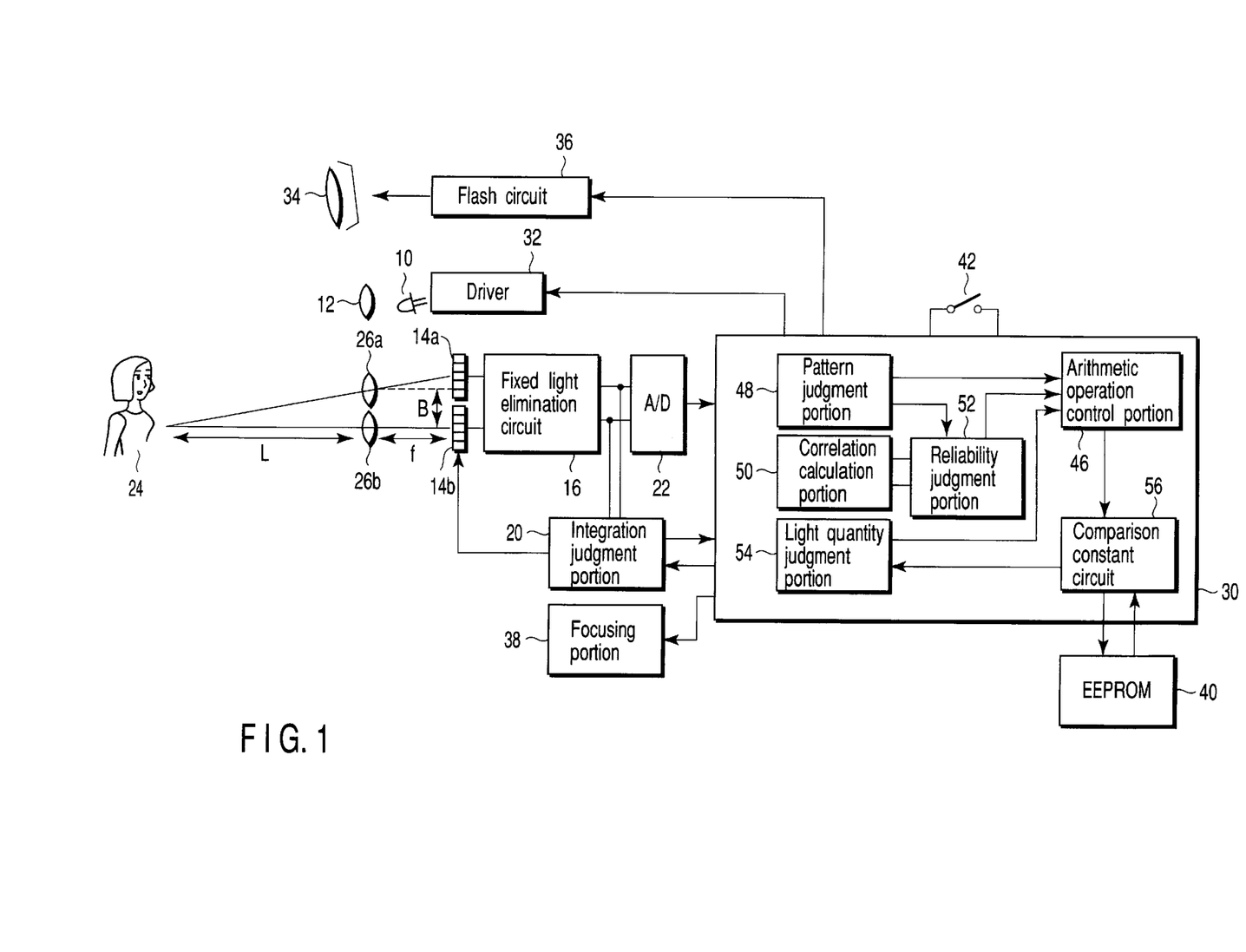
FIG. 1 is a view showing a structure of a distance measuring apparatus according to a first embodiment of the present invention.

FIG. 1 is a view showing a structure of a distance measuring apparatus according to a first embodiment of the present invention.

In FIG. 1, a CPU 30 is arithmetic operation controlling means constituted by a one-chip microcomputer or the like. To the CPU 30 are connected an integration judgment portion 20 for judging the output signal from the above-described integration circuit 18, an A/D conversion portion 22, a driver 32 for driving the IRED 10, a flash circuit 36 for driving a flash light emission portion 34, a focusing portion 38, an EEPROM 40 as storing means, and a release switch 42.

Moreover, the CPU 30 has an arithmetic operation control portion 46, a pattern judgment portion 48, a correlation calculation portion 50, a reliability judgment portion 52, a light quantity judgment portion 54, and a comparison constant circuit 56.

Sensor arrays 14a and 14b are arranged with the above-mentioned photo detector pixels being aligned therein. Reflected light rays from a subject 24 enter the sensor arrays 14a and 14b through photo acceptance lenses 26a and 26b.

In order to form an image of the subject 24 on the sensor arrays 14a and 14b, two photo acceptance lenses 26a and 26b are provided in front of the respective sensor arrays 14a and 14b so that these lenses are separated from the sensor arrays by only a focal distance f. An azimuth difference B is imparted to these lenses 26a and 26b and a distance L to the subject is obtained based on the principle of triangulation.

Depending on a value of the subject distance L, an image of the subject 24 formed on the two sensor arrays 14a and 14b changes a relative position of each lens optical axis reference. In order to detect this position, an A/D conversion portion 22 converts integration outputs from the sensor arrays 14a and 14b (in this example, the integration circuit 18 is included in each pixel of the respective sensor arrays 14a and 14b and omitted in FIG. 1) into digital signals.

Then, the CPU 30 compares a digital image signal of the sensor array 14a with that of the sensor array 14b, detects a difference in relative position and calculates the distance. In order to check whether images detected from the two sensor arrays 14a and 14b belong to the same subject, the CPU 30 includes functions of a pattern judgment portion 48, a correlation calculation portion 50 and the like. That is, the pattern judgment portion 48 is used for confirming whether patterns of images detected from the sensor arrays 14a and 14b are appropriate for distance measurement. In addition, the correlation calculation portion 50 is used for detecting a difference in the relative position of the images.

The reliability judgment portion 52 judges the reliability of distance measurement from the degree of coincidence of images. Alternatively, the portion 52 judges the reliability of distance measurement from the outputs of the pattern judgment portion 48 and correlative calculation portion 50 if the patterns have been determined to be low-contrast ones, repeated ones, monotonously increasing ones or monotonously decreasing ones. Additionally, the light quantity judgment portion 54 projects a distance measurement light ray when eliminating the fixed light ray and judges a quantity of incident light reflected by the subject 24 and enters. Results of such judgment are supplied to the arithmetic operation control portion 46.

Further, the comparison constant circuit 56 is used for reading and setting a comparison constant stored in the EEPROM 40 in advance when judging a quantity of light in the light quantity judgment portion 54.

A quantity of control of the focusing portion 38 is determined by a result of each of such functions in the CPU 30.

Furthermore, the CPU 30 detects an input state of the release switch 42 and also controls a camera shooting sequence. Moreover, when measuring a distance, the CPU 30 controls light projection of the IRED 10 through a driver 32 or controls light emission of a flash light emission portion 34 through a flash circuit 36 according to needs.

Figure 4A:
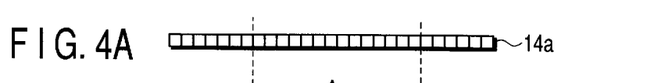
FIGS. 4A to 4G are views showing examples of a distance measurement sensor and an image signal outputted from the distance measurement sensor.
Figures 4B, 4C, 4D:
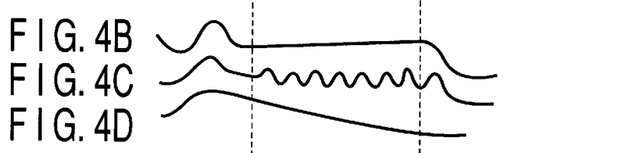
Figures 4E, 4F:
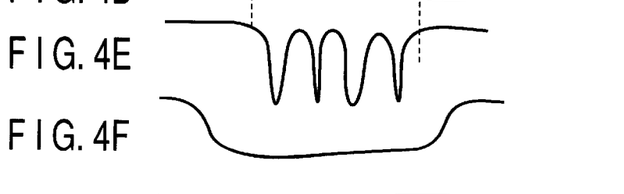

In the present invention, when an image signal outputted from a predetermined area A has the following patterns in the distance measurement sensor (sensor array) 14a arranged as shown in FIG. 4A, the IRED 10 projects a light ray and a distance is measured by using a pattern of the reflection signal light. That is, in case of a low-contrast pattern as shown in FIG. 4B, a repeated pattern as shown in FIG. 4C or a monotonous change pattern as shown in FIG. 4D, or in case of the low reliability as a result of correlation calculation, distance measurement described above is carried out. It is to be noted that FIG. 4E shows an output pattern according to a light projection pattern when the IRED 10 is caused to project a light ray.

In addition, a mask for forming a pattern may be provided in front of the condenser lens 12, or a pattern of the light emission portion itself may be used.

Figure 4G:
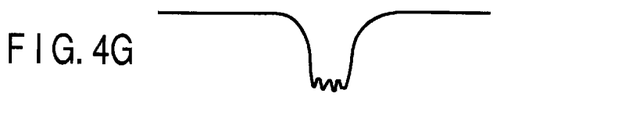

Additionally, when a quantity of reflection signal light from the IRED 10 is small, the distance is measured by light projection using the flash light emission portion 34 having a larger quantity of light. In this case, however, since there is no specific pattern of the reflection signal light, a signal light distribution with low contrast is obtained in most cases as shown in FIG. 4F. If the subject exists only at the central part of a screen, however, the contrast is generated as shown in FIG. 4G, and the distance can be measured by using this image.

Figure 5:
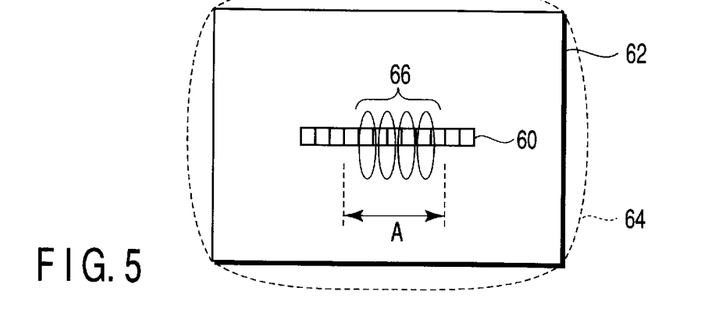
FIG. 5 is a view showing the positional relationship of a sensor array and a light projection pattern with a screen of a camera to which the present invention is applied being used as a reference.

Using as a reference a screen of a camera to which the present invention is applied, the positional relationship between the sensor array and the light projection pattern is as shown in FIG. 5.

A monitor area 60 of the sensor array exists at the central part of a screen 62, and the entire screen must be irradiated with the flash light in order to control exposure, thereby obtaining a large pattern 64. Further, the pattern light of the IRED 10 forms a luminosity pattern as typified by a pattern 66.

In such a distance measuring apparatus, a mode for measuring a distance by using a difference in relative position of image signals of a subject, without light projection, for distance measurement is called "passive AF". On the contrary, a distance measurement mode involving the fixed light elimination operation and also involving light projection of, e.g., the IRED or flash is called "active AF".

The operation of the distance measuring apparatus according to this embodiment will now be described with reference to a flowchart of FIG. 6.

At a step S1, distance measurement is first carried out in the passive mode mentioned above. Then, at a step S2, an integration time $t_{INT}$ when the image signal is integrated to a predetermined level is obtained. Subsequently, at a step S3, the reliability of the passive AF is judged.

Here, when it is determined that the reliability of the passive AF is high by the pattern judgment mentioned above or a result of correlation calculation, processing advances to a step S4. Then, at the step S4, distance measurement is conducted by triangulation by using positions of the two image signals. On the other hand, when it is determined that the reliability of the passive AF is low, processing proceeds to a step S5, and preliminary distance measurement is carried out by using the IRED 10. At this time, a pulse light ray is projected $n_0$ times for a predetermined time, and an integral voltage $V_{INT}$ is calculated by the A/D conversion portion 22.

If the integral voltage $V_{INT}$ is high, it can be determined that the light from the IRED 10 has reached the subject 24 satisfactorily. On the other hand, if the $V_{INT}$ is low, it is determined that a quantity of light from the IRED 10 is insufficient, and flash light projection with the higher intensity is carried out. At this time, however, correct judgment cannot be performed if the fixed light component such as a sunbeam or artificial illumination with which the subject 24 is irradiated is not taken into consideration.

In order to detect the fixed light component, therefore, a result of monitoring an integration time at the time of the passive AF ($t_{INT}$) at the step S1 (see the step S2) is used, and the luminosity is judged at a step S6. That is, by comparing the integration time $t_{INT}$ with a predetermined time $t_0$, judgment voltages $V_1$ and $V_2$ used for judging a level of the integral voltage $V_{INT}$ when performing IRED preliminary integration at the step S4 are determined. Incidentally, as to the judgment voltages, a value of $V_2$ is larger than that of $V_1$.

At the step S6, if it is determined that the integration time $t_{INT}$ is shorter than the predetermined time $t_0$, namely, it is determined a scene is bright, processing advances to a step S11. Subsequently, at the step S11, the judgment voltage $V_2$ and $V_{INT}$ are compared. By this comparison, judgment is made upon whether the IRED 10 or the flash light emission portion 34 is to be used to perform distance measurement. As a result, if the integral voltage $V_{INT}$ is higher than the judgment voltage $V_2$, processing advances to a step S8. If the integral voltage $V_{INT}$ is lower than the judgment voltage $V_2$, processing proceeds to a step S12.

Further, if it is determined in the step S6 that a quantity of fixed light is small in a dark scene and the integration time $t_{INT}$ is longer than the predetermined time $t_0$, processing advances to a step S7. Then, at the step S7, the voltage $V_1$ lower than the judgment voltage $V_2$ is compared with the integral voltage $V_{INT}$ at the time of IRED preliminary integration. By this comparison, judgment is made in order to select either the IRED 10 or the flash light emission portion 34 to perform distance measurement. As a result, if the integral voltage $V_{INT}$ is higher than the judgment voltage $V_1$, processing advances to the step S8. If the integral voltage $V_{INT}$ is lower than the judgment voltage $V_1$, processing proceeds to a step S12.

As the integral voltage $V_{INT}$, it is possible to select an integral voltage of a sensor having a largest quantity of incident light among all the sensors constituting the sensor array or select an integral voltage of a sensor having a largest quantity of incident light in a predetermined area of the sensor array.

By using the light projection source determined in this way, distance measurement is carried out in the active mode utilizing the light of the IRED 10 or the flash light emission portion 34 at the step S8 or the step S12 (actual distance measurement). In this measurement, integration of the projected light is repeated until it reaches a predetermined voltage by light emission in a predetermined time.

That is, if distance measurement is to be made using the IRED 10, distance measurement utilizing the IRED 10 is conducted at the step S8. Subsequently, judgment is made upon whether integration is terminated at a step S9. If it is not terminated, a number of times of integration is compared at a step S10. Here, if a number of times of integration has not reached $n_1$ of a limiter, control returns to the step S8, and the processing at the steps S8 to S10 is repeated. Further, if integration is terminated at the step S9 or a number of times of integration has reached $n_1$ of the limiter, control shifts to a step S15.

On the other hand, if distance measurement is to be made using the flash light emission portion 34, distance measurement is carried out by utilizing the flash light emission portion 34 at the step S12. Then, judgment is made upon termination of integration at the step S13. If it is not terminated, a number of times of integration is compared at a step S14. Here, if a number of times of integration has not reached $n_2$ of the limiter, control returns to the step S12, and the processing at the steps S12 to S14 is repeated. Furthermore, if integration is terminated at the step S13 or a number of times of integration has reached $n_2$ of the limiter at the step S14, control advances to a step S15.

In both cases of distance measurement using the IRED 10 and the flash light emission portion 34, if projection light integration is carried out beyond a predetermined number of times, energy is wasted, which produces a time lag. As described above, therefore, integration number limiters ($n_1$ and $n_2$) are provided at the steps S10 and S14.

At the step S15, a result P (dividing the integral voltage $V_{INT}$ by a number of times of integration) of integrating a quantity of the reflected light is obtained as described above. Subsequently, at a step S16, pattern judgment is conducted. Then, based on results obtained at the steps S15 and S16, judgment in made upon whether triangulation is possible at a step S17.

Here, if the reflected light image signal with which triangulation is possible is obtained, processing advances to a step S18, and triangulation is carried out. Then, the reliability of a result of this triangulation is judged at a step S19. Consequently, if the reliability of triangulation is high, actual distance measurement is terminated.

On the contrary, if the reliability of triangulation is low, and if it is determined that the pattern is insufficient (triangulation is NG) at the step S17, processing proceeds to a step S20. Then, at the step S20, light quantity AF is performed by using the reflected light quantity P mentioned above.

This is a distance measurement mode utilizing the fact that a large quantity of light returns from a short distance and a small quantity of light returns from a long distance when a light ray is projected, and a quantity of reflected light is checked, which is effective for a subject having no contrast. It is, however, assumed that the reflectivity of a subject falls within a predetermined range.

Figure 7:
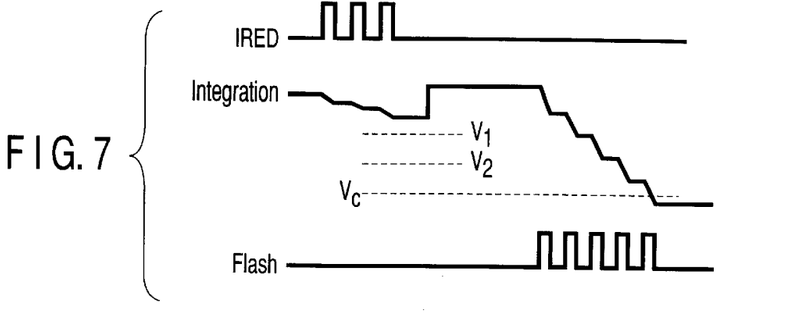
FIG. 7 is a timing chart for illustrating operations of IRED, integration and flash.
Figure 8A:
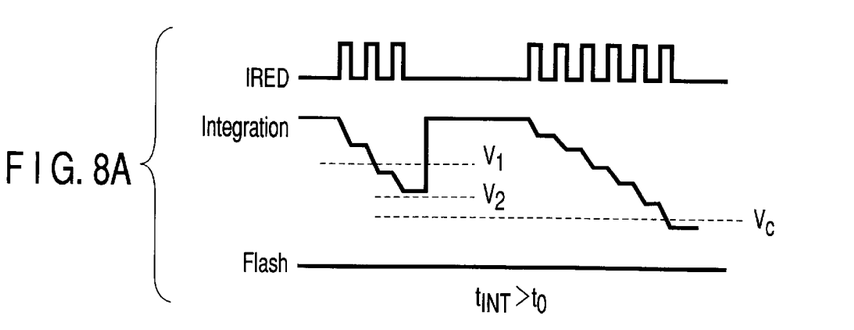
FIG. 8A is a timing chart when tINT is larger than $t_0$ (dark) at the time of passive AF even though integration is performed without changing a quantity of integration with three times of IRED light emission.
Figure 8B:
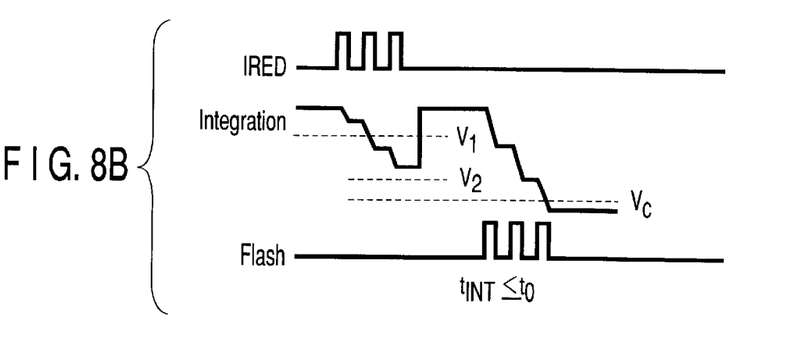
FIG. 8B is a timing chart when tINT is not more than $t_0$ (bright) at the time of passive AF.

FIGS. 7, 8A and 8B are timing charts of the IRED, integration and flash operating in accordance with the above-described flowchart.

FIG. 7 shows an operation in an example in which a result of preliminary distance measurement ($V_{INT}$ when $n_0=3$) is not more than $V_1$ when the IRED 10 emits three pulses of light, and it is determined that distance measurement cannot be performed with the light from the IRED 10, so the method is changed to distance measurement using the flash light.

That is, preliminary distance measurement is carried out by using the IRED 10 (step S5). Here, at the time of preliminary distance measurement using the IRED 10 to emit three pulses of light, it is determined that distance measurement cannot be performed using the IRED 10 since the integral voltage $V_{INT}$ is not more than $V_1$ (steps S6 and S7). Therefore, the flash AF is operated using the flash light emission portion 34 (step S12). Further, in this case, since an integral judgment voltage $V_c$ has been reached upon five light emissions of the flash, further light emission is terminated (steps S13 and S14).

Alternatively, even if the integral voltage $V_{INT}$ at the time of preliminary distance measurement involving the IRED 10 emitting three pulses of light is not more than $V_2$, it is determined that distance measurement using the IRED 10 is impossible (steps S6 and S11). As a result, the flash AF method using the flash light emission portion 34 is operated (step S12).

Furthermore, FIG. 8A is a timing chart showing that the integration time $t_{INT}$ at the time of passive AF is larger than the predetermined time $t_0$ (dark), even through integration is performed upon three IRED light pulses emissions.

That is, preliminary distance measurement using the IRED 10 is carried out (step S5). Moreover, a distance measurement time $t_{INT}$ at the time of preliminary distance measurement with the IRED 10 emitting three pulses of light is larger than the predetermined time $t_0$, and it is determined that the integral voltage $V_{INT}$ has exceeded the predetermined voltage $V_1$ (steps S6 and S7). Therefore, AF using the IRED 10 is conducted (step S8). Thereafter, the IRED 10 terminates light emission since it has reached the integral judgment voltage $V_c$ upon emission of six pulses of light (steps S9 and S10).

FIG. 8B is a timing chart showing that the integration time $t_{INT}$ at the time of passive AF is not more than the predetermined time $t_0$ (bright) even though integration is performed upon three IRED light pulse emissions.

That is, preliminary distance measurement using the IRED 10 is carried out (step S5). Here, since the integral voltage $V_{INT}$ is not more than $V_2$ in preliminary distance measurement when the IRED has emitted three pulses of light, it is determined that distance measurement cannot be performed with the light from the IRED 10 (steps S6 and S11). Therefore, flash AF method using the flash light emission portion 34 (step S12) is performed. In addition, in this case, since the integral judgment voltage $V_c$ has been reached upon three light pulse emission, flash light emission is terminated (steps S13 and S14).

Figure 6:
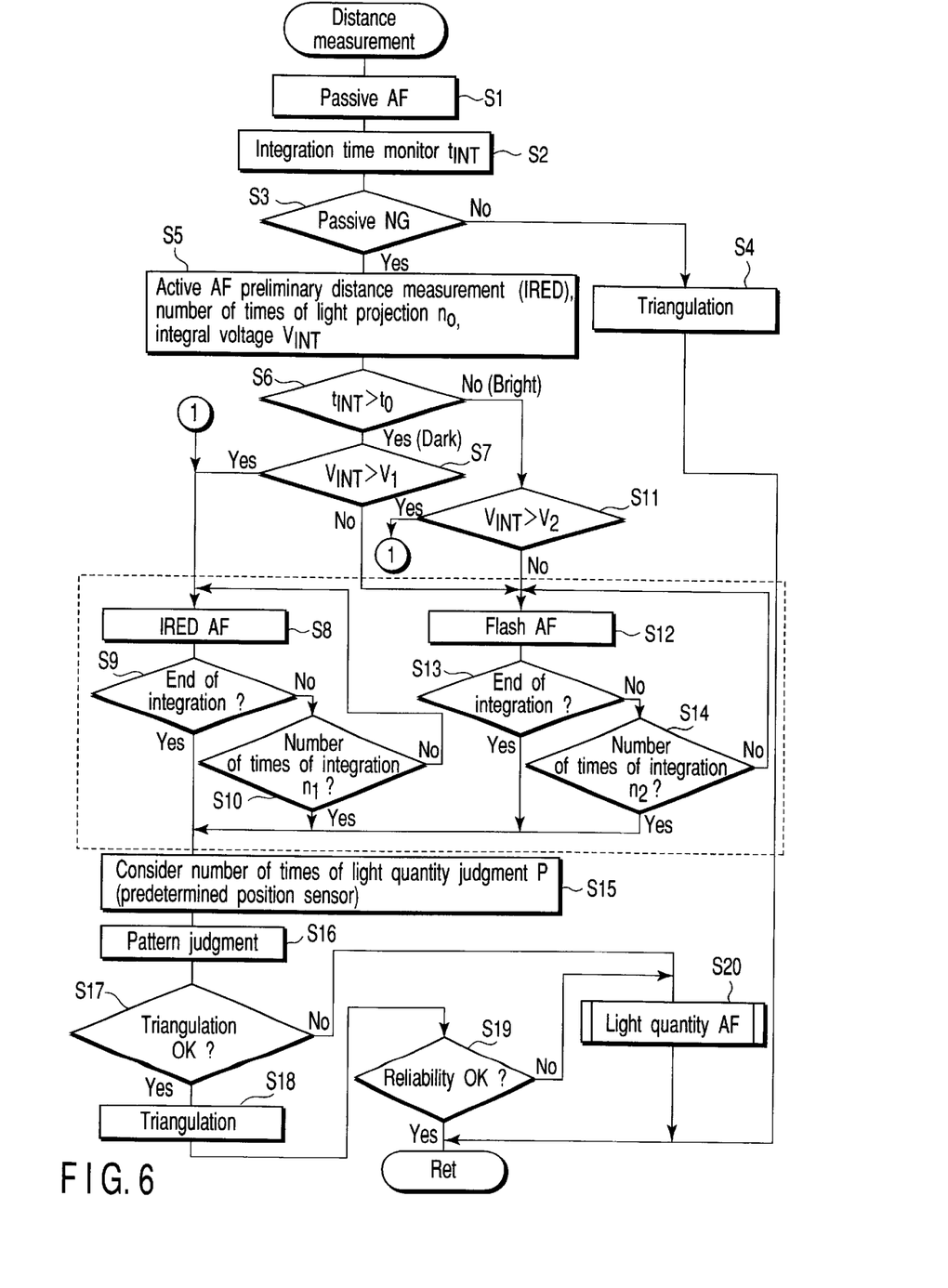
FIG. 6 is a flowchart for illustrating an operation of a distance measuring apparatus in the first embodiment according to the present invention.

As described above, the timing charts of FIGS. 7, 8A and 8B show how the latter half of the actual distance measurement indicated within a broken line in the flowchart of FIG. 6 is switched between the IRED or the flash by changing over the judgment voltage from $V_2$ to $V_1$ or vice versa in the correspondence relationship.

When a scene is bright, the photo-electric current $I_P$ is increased as described above, and noise tends to be superposed to the sensor or the hold transistor, and they are integrated beyond an actual quantity. The following countermeasure is devised for this problem. That is, the judgment voltage $V_2$ when the scene is bright is set higher than the judgment voltage $V_1$ when the scene is dark. If such a countermeasure is not taken, the IRED may be selected in a scene that the distance cannot be actually measured by the IRED, which may result in erroneous distance measurement in the actual measurement.

In such case, it is possible to correctly switch to distance measurement using the flash by taking the above-described countermeasure according to the present invention, and accurate distance measurement is enabled with a sufficient quantity of reflected light. Additionally, when the flash is not necessary, IRED distance measurement is carried out with which power consumption is low, and hence the energy saving advantage can be also obtained.

Description will now be given as to how a noise error is dealt with when a distance is measured in a very bright scene.

Figure 9:
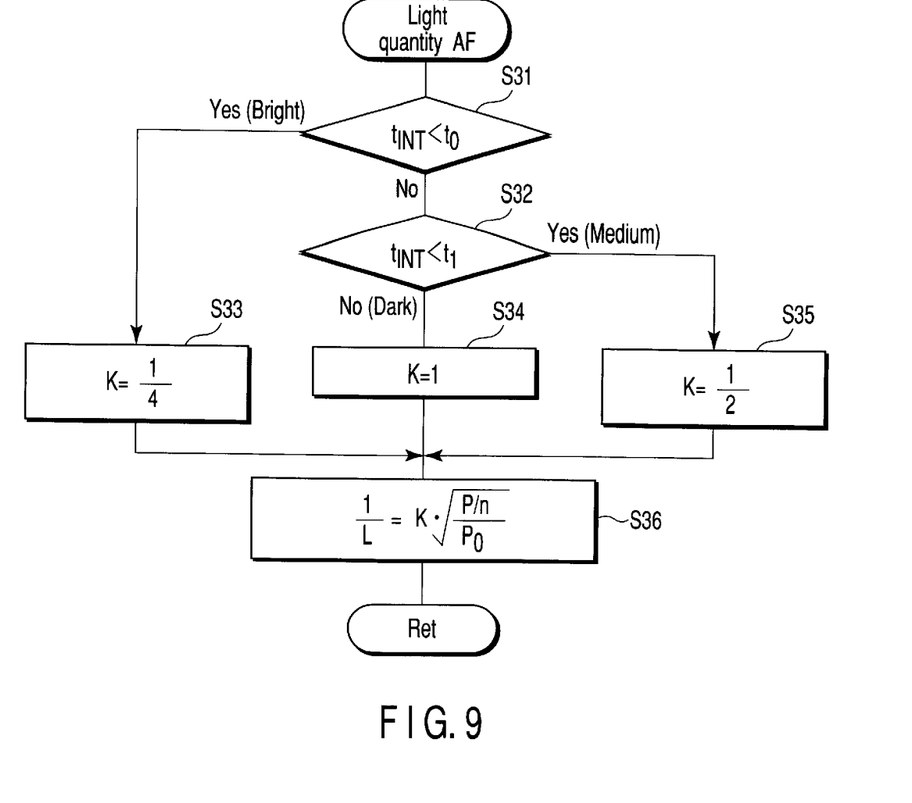
FIG. 9 is a flowchart for illustrating a subroutine "light quantity AF" at a step S20 in the flowchart of FIG. 6.

FIG. 9 is a flowchart for illustrating a subroutine "light quantity AF" at a step S20 in the flowchart of FIG. 6.

At steps S31 and S32, judgment is made upon switching a correction factor K of light quantity AF by the integration time $t_{INT}$ in passive distance measurement. Here, assuming that the predetermined time $t_0 < t_1$, processing proceeds to a step S33 in case of a very bright scene ($t_{INT} < t_0$); a step S34 in case of a dark scene ($t_{INT} \geq t_1$); and a step S35 in case of a scene having the brightness which is in between the former cases ($t_0 \leq t_{INT} < t_1$), respectively.

In a dark scene, since the noise error does not have to be taken into consideration, the correction factor K at the step S34 is "1". As the scene becomes brighter, the correction factor K is decreased to "½" and "¼". That is, in case of a bright scene at the step S33, "¼" is set as the correction factor. Similarly, in a dark scene at the step S34, "1" is set as the correction factor. Further, in a scene having the brightness which is in between the former cases, "½" is set as the correction factor.

Thereafter, processing advances to a step S36, and a long distance is calculated by the following expression.

$$\frac{1}{L} = K \cdot \sqrt{\frac{P/n}{P_0}}$$

The long distance is so calculated, because the distance would otherwise be calculated to be shorter than it is, because noise or offset components are integrated for a bright scene. The reciprocal 1/L of the distance to the object is proportional to the feed of the focusing lens provided in an AF camera. To find reciprocal 1/L, the term defined by the quantity $P_0$ of light reflected from the object at the distance of 1 m, the number n of times light is emitted, and the quantity P of incident light is multiplied by the correction factor K described above. The error of light quantity AF for a bright object is thereby compensated for.

Furthermore, the quantity of light $P_0$ varies depending on whether the IRED 10 is used as the light source or the flash light emission portion 34 is used. Therefore, two different values of $P_0$ are pre-stored in the EEPROM 40.

As described above, according to the first embodiment, it is possible to provide a distance measuring apparatus which can switch between distance measurement modes according to the subject, and has no difficulty in handling specific subjects.

That is, with respect to a subject whose distance can be measured by an image signal, distance measurement in the passive mode is carried out, in which triangulation is performed at the step S4 by using a value of passive AF obtained at the step S1, in FIG. 6.

Moreover, with respect to a subject whose pattern can be definitely judged among subjects whose distance can be measured by the IRED, the active triangulation mode is executed, in which triangulation at the step S18 is performed by using a value of AF by the IRED 10 obtained at the step S8.

In addition, if a distance to a subject is far, a light quantity distance measurement mode of the IRED is operated, for performing light quantity AF at the step S20, by using a value of AF utilizing the IRED 10 at the step S8, a flash triangulation mode for performing triangulation at the step S18 by using a value of AF utilizing flash light emission at the step S12, or a flash light quantity distance measurement mode for performing light quantity AF at the step S20 by using a value of AF utilizing flash light emission at the step S12.

By changing these distance measurement modes according to each scene, it is possible to accurately measure a distance without erroneous judgment upon switching, or erroneous judgment on a quantity of light, even in a bright scene.

A second embodiment according to the present invention will now be described.

Figure 10:
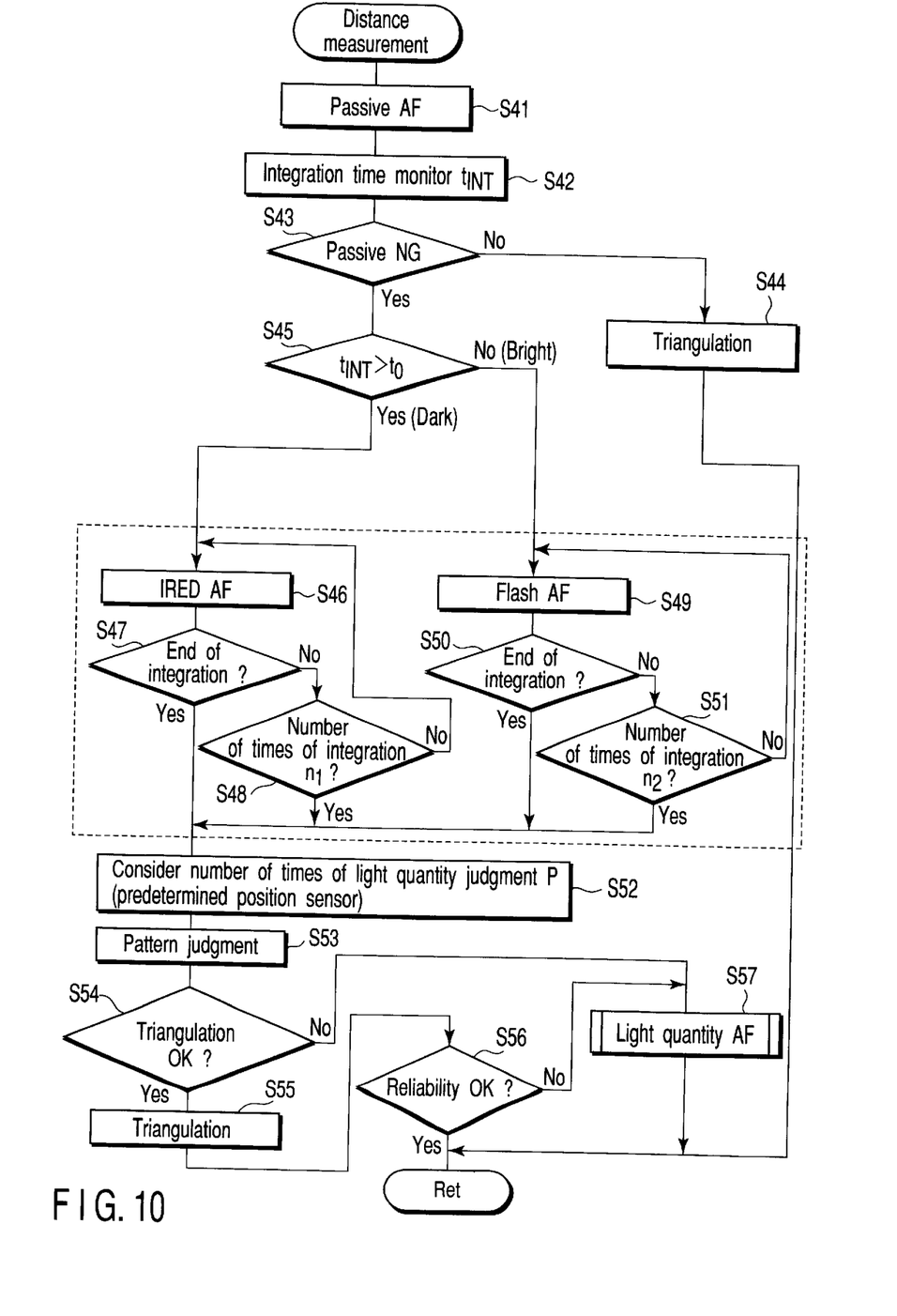
FIG. 10 is a flowchart for illustrating an operation of a distance measuring apparatus according to a second embodiment of the present invention.

FIG. 10 is a flowchart for illustrating an operation of a distance measuring apparatus in the second embodiment according to the present invention.

At a step S41, distance measurement is first carried out in the passive mode, and the integration time $t_{INT}$ is obtained at a step S42. Then, at a step S43, the reliability of passive AF is judged. Here, if it is determined that the reliability of passive AF is high, processing advances to a step S44, and a distance is calculated by triangulation positions of two image signals. On the other hand, if it is determined that the reliability of passive AF is low, processing proceeds to a step S45.

At the step S45, judgment is made upon whether a subject is bright. That is, if it is determined that a quantity of fixed light is small in a dark scene and the integration time $t_{INT}$ is longer than the predetermined time $t_0$, processing advances to a step S46. On the other hand, if it is determined that the integral time $t_{INT}$ is shorter than the predetermined time $t_0$, namely, a subject is bright, processing proceeds to a step S49.

In this manner, distance measurement in the active mode utilizing the light from the IRED 10 or the flash light emission portion 34 is carried out at the step S46 or the step S49 (actual distance measurement). In this measurement, integration of light projection is repeated until it reaches a predetermined voltage with light emission in a predetermined time.

That is, in the case of distance measurement in a dark scene by using the IRED 10, distance measurement using the IRED 10 is performed at the step S46. Subsequently, judgment is made upon termination of integration at a step S47. If it is not terminated, a number of times of integration is compared at a step S48. Here, if a number of times of integration has not reached $n_1$ of the limiter, processing advances to the step S46, and processing at the steps S46 to S48 is repeated. Then, if it is determined that integration is terminated at the step S47 or a number of times of integration has reached $n_1$ of the limiter at the step S48, processing advances to a step S52.

On the other hand, in the case of distance measurement in a bright scene using the flash light emission portion 34, distance measurement using the flash light emission portion 34 is carried out at a step S49. Subsequently, judgment is made upon termination of integration at a step S50. If it is not terminated, a number of times of integration is compared at a step S51. Here, if a number of times of integration has not reached $n_2$ of the limiter, processing advances to the step S49, and processing at the steps S49 to S51 is repeated. Moreover, if it is determined that integration is terminated at the step S50 or a number of times has reached $n_2$ of the limiter at the step S51, the process proceeds to a step S52.

At the step S52, a result P of integrating a quantity of reflected light (dividing the integral voltage $V_{INT}$ by a number of times of integration) is obtained. Subsequently, a pattern is judged at a step S53, and processing proceeds to a step S54. From the results obtained at the steps S52 and S53 it is determined at the step S54 whether triangulation can be performed.

If triangulation can be performed, the process goes to the step S55. At the step S55, triangulation is carried out. Then, at the step S56 it is determined whether the triangulation is reliable. If the triangulation is found to be reliable, the process comes to an end.

At the step S56, the triangulation is found not to be reliable. At the step S54, it may be determined that triangulation cannot be performed. In either case, the process goes to the step S57. In the step S57, a quantity AF of light is calculated from the value P obtained by integrating the quantity of light reflected.

Since the processing operation at the steps S41 to S44, the steps S46 to S48, the steps S49 to S51, the steps S52 to S57 are similar to those of the steps S1 to S4, the steps S8 to S10, the steps S12 to S14 and the steps S15 to S20, a detailed explanation is omitted here.

As described above, in the case of a scene having the bright fixed light, the noise is increased, the S/N ratio is deteriorated even though the reflected light based on light projection by the IRED is detected, and the reflection signal light is lost in the noise. Therefore, since the flash light emission portion is caused to emit light in a bright scene and the distance measurement light having a high intensity is projected in the second embodiment, it is possible to suppress the disadvantage that the reflection signal light is lost in the noise.

Incidentally, in the above description, the integration time $t_{INT}$ when the image signal is integrated to a predetermined level is obtained at the step S2 and the brightness is judged by using this integration time at the step S6 in order to judge the brightness of the fixed light. As a modification, a voltage integrated in a predetermined time may be calculated at the step S2, and the brightness may be judged by using the integral voltage at the step S6.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A distance measuring apparatus comprising:
    a sensor for detecting an incident light ray from an object;
    a light source including a first light source and a second light source different from said first light source;
    a circuit for detecting a reflected light component from the object based on an output from said sensor when said light source emits light;
    a circuit for selecting either said first light source or said second light source for light emission by comparing an output from said detection circuit with a reference value; and
    a circuit for setting said reference value in accordance with an output from said sensor when said light source does not emit light.

2. The distance measuring apparatus according to claim 1, wherein said second light source has a quantity of light emission larger than that of said first light source.

3. The distance measuring apparatus according to claim 2, wherein said first light source is a semiconductor light emitting device and said second light source is a flash light emission portion.

4. The distance measuring apparatus according to claim 2, wherein said first light source is a light source for forming a luminosity pattern and said second light source is a light source for emitting uniform light rays.

5. The distance measuring apparatus according to claim 2, wherein said detection circuit detects a reflected light component from said object based on an output from said sensor when said first light source emits light.

6. The distance measuring apparatus according to claim 2, wherein said selection circuit selects said first light source when a quantity of light reflected from said object, detected by said detection circuit, is larger than a reference value, and selects said second light source when the quantity of light reflected from said object is smaller than said reference value.

7. The distance measuring apparatus according to claim 2, wherein said setting circuit sets said reference value in such a manner that said second light source is apt to be selected in a case where it is determined that said object has a brightness higher than a predetermined value from an output from said sensor when said light source does not emit light as compared with a case where it is determined that said brightness is lower than said predetermined value.

8. The distance measuring apparatus according to claim 1, wherein said sensor is constituted by a plurality of line sensors, said apparatus further comprising a passive distance measurement circuit for measuring a distance to said object based on a difference in relative position between outputs of a plurality of said line sensors.

9. The distance measuring apparatus according to claim 1, further comprising an active light quantity distance measurement circuit for calculating a distance to said object based on a quantity of reflected light from said object which is detected by said detection circuit and caused due to a projected light ray from said light source.

10. The distance measuring apparatus according to claim 9, wherein said first light source is a semiconductor light emitting device and said second light source is a flash light emission portion, said active light quantity distance measurement circuit including a first distance measurement circuit having said semiconductor light emitting device as a light source and a second distance measurement circuit having said flash light emission portion as a light source.

11. The distance measuring apparatus according to claim 9, further comprising a circuit for determining a correction algorithm when calculating a distance to said object based on an output from said sensor when said light source does not emit light.

12. The distance measuring apparatus according to claim 1, wherein said sensor is constituted by a plurality of line sensors, said apparatus further comprising an active triangulation circuit for calculating a distance to said objected based on a difference in relative position caused between outputs from a plurality of said line sensors.

13. The distance measuring apparatus according to claim 12, wherein said first light source is a semiconductor light emitting device and said second light source is a flash light emission portion, said active triangulation circuit including a first distance measurement circuit having said semiconductor light emitting device as a light source and a second distance measurement circuit having said flash light emission portion as a light source.

14. The distance measuring apparatus according to claim 1, wherein said sensor is constituted by a plurality of line sensors, said apparatus further comprising:

a passive distance measurement circuit for measuring a distance to said object based on a difference in relative position between outputs from a plurality of said line sensors; and an active light quantity distance measurement circuit for calculating a distance to said object based on a quantity of reflected light from said object which is detected by said detection circuit and caused due to a projected light ray.

15. A distance measuring apparatus comprising:

a sensor for detecting an incident light ray from an object;

a light source for projecting a light ray onto said object;

a circuit for detecting a reflected light component from said objected based on an output from said sensor when said light source emits light;

a distance measurement circuit for calculating a distance to said object based on a quantity of reflected light from said object which is detected by said detection circuit and caused due to a projected light ray from said light source; and a circuit for determining a correction algorithm used when calculating a distance to said object by said distance measurement circuit based on an output from said sensor when said light source does not emit light.

16. A distance measuring apparatus comprising:

two light sources capable of emitting different quantities of light;

a sensor for receiving a light ray from an object;

a distance measurement calculation circuit which calculates a distance to said object based on an output from said sensor, and which has a passive distance measurement mode for performing calculation based on a direction of an incident light ray upon said sensor when said light source does not emit light and an active light quantity distance measurement mode for performing calculation based on a quantity of incident light ray upon said sensor caused due to light emission of said light source; and a circuit for selecting one of the two light sources.

17. The distance measuring apparatus according to claim 16, wherein said selecting circuit selects said one of said two light sources based on an output from said sensor caused due to light emission of said light source.

18. The distance measuring apparatus according to claim 17, wherein said selecting circuit selects said one of said two light sources by comparing it with an output from said sensor at the time of no light emission of said light source.

19. The distance measuring apparatus according to claim 16, wherein said distance measurement calculation circuit further has an active triangular distance measurement mode for performing calculation based on a position of an incident light ray upon said sensor when said light source emits light.

20. A distance measuring apparatus comprising:

a first light projection source for projecting a first distance measurement light ray onto an object;

a second light projection source for projecting onto said object a second distance measurement light ray whose intensity is higher than that of said first distance measurement light ray;

a sensor array for converting an incident light distribution from said object into an electrical signal;

first distance determining means for determining a distance to said object from an output from said sensor array when said first distance measurement light ray is projected;

second distance determining means for determining a distance to said object from an output from said sensor array when said second distance measurement light ray is projected; and selecting means for selecting either said first distance determining means or second distance determining means based on an output level of said sensor array when said first and second distance measurement light rays are not projected.

21. The distance measuring apparatus according to claim 20, further comprising extracting means for extracting only a reflected light component of said first distance measurement light ray from an output signal from said sensor array when said first distance measurement light ray is projected onto said object, wherein said selecting means selects either said first distance determining means or said second distance determining means based on an output from said extracting means and an output level of said sensor array when said first and second distance measurement light rays are not projected.

22. A distance measuring apparatus comprising:

a sensor array for converting a distribution of light incident from an object into an electrical signal;

a light projection source for projecting a distance measurement light ray onto said object;

reflection signal light extracting means for extracting from an output of said sensor array a reflection signal light ray when said light projection source projects a light ray;

judging means for judging an output level of said sensor array when said light projection source is not actuated; and distance measuring means for determining distance measurement based on one of (a) an output result of an image signal output by said sensor array when said extracting means is not actuated and (b) a result obtained by making a calculation with a judgment formula with respect to a reflected light quantity signal according to a quantity of projected light from said light projection source, the judgment formula being selected in accordance with a result of judgment by said judging means.

23. The distance measuring apparatus according to claim 22, wherein said light projection source includes a first light projection source and a second light projection source having energy required for projection different from that of said first light projection source, said apparatus further comprising controlling means for switching between said first and second light projection sources in accordance with a result of output from said judging means.

* * * * *